United States Patent
Kunitake et al.

(10) Patent No.: US 8,069,673 B2
(45) Date of Patent: Dec. 6, 2011

(54) SEAL STRUCTURE FOR GAS TURBINE COMBUSTOR

(75) Inventors: Nobuhiro Kunitake, Hyogo (JP); Kuniaki Aoyama, Hyogo (JP); Kiyoshi Fujimoto, Hyogo (JP); Masaharu Minami, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 66 days.

(21) Appl. No.: 12/767,055

(22) Filed: Apr. 26, 2010

(65) Prior Publication Data

US 2010/0201080 A1 Aug. 12, 2010

Related U.S. Application Data

(62) Division of application No. 11/990,769, filed as application No. PCT/JP2006/316197 on Aug. 11, 2006, now Pat. No. 7,788,932.

(30) Foreign Application Priority Data

Aug. 23, 2005 (JP) ................................ 2005-240878

(51) Int. Cl.
*F02C 7/20* (2006.01)
(52) U.S. Cl. ................ 60/797; 60/799; 60/800
(58) Field of Classification Search ............ 60/752–760, 60/805, 797, 799, 800; 277/637, 644, 654, 277/906
See application file for complete search history.

(56) References Cited

U.S. PATENT DOCUMENTS

| 5,624,227 | A | * | 4/1997 | Farrell ........................... 415/139 |
| 6,193,240 | B1 | * | 2/2001 | Johnson et al. ................ 277/643 |
| 6,315,301 | B1 | | 11/2001 | Umemura et al. |

(Continued)

FOREIGN PATENT DOCUMENTS

CA 2 287 509 9/1999

(Continued)

OTHER PUBLICATIONS

International Search Report issued Nov. 21, 2006 in International (PCT) Application No. PCT/JP2006/316197.

(Continued)

*Primary Examiner* — William Rodriguez
*Assistant Examiner* — Vikansha Dwivedi
(74) *Attorney, Agent, or Firm* — Wenderoth, Lind & Ponack, L.L.P.

(57) ABSTRACT

Provided is a seal structure, according to the present invention, for sealing opposite surfaces of flanges between adjacent tail ducts, which can be prevented from being worn or aged deteriorated due to a thermal deformation in a high temperature atmosphere or vibration of a gas turbine combustor, and which can maintain a satisfactory sealing function for a long time. The seal structure is characterized in that recess grooves are formed in opposed surfaces of adjacent flanges at the outlet end of tail ducts, striding between the opposed surfaces, a seal assembly composed of a seal member and a leaf spring is inserted in the recess grooves, the seal member has a pair of continuous beads which are arranged facing the inner surfaces, on the combustion gas passage side, of the recess grooves, striding between the opposed surfaces of the flanges within the recess grooves, the leaf spring is arranged so as to be contact with the seal member within the recess grooves so that the beads are pressed against the surfaces on the combustion gas passage side by the resilient force of the leaf spring so as to create seal surfaces.

2 Claims, 13 Drawing Sheets

U.S. PATENT DOCUMENTS

| | | |
|---|---|---|
| 6,431,825 B1 * | 8/2002 | McLean .................. 415/135 |
| 6,751,962 B1 | 6/2004 | Kuwabara et al. |
| 2004/0051254 A1 | 3/2004 | Smed |
| 2004/0052637 A1 * | 3/2004 | Paprotna et al. ........... 415/170.1 |
| 2005/0082768 A1 | 4/2005 | Iguchi et al. |
| 2005/0179215 A1 * | 8/2005 | Kono .......................... 277/628 |

FOREIGN PATENT DOCUMENTS

| | | |
|---|---|---|
| EP | 1 176 343 | 1/2002 |
| JP | 43-8821 | 4/1968 |
| JP | 54-027611 | 3/1979 |
| JP | 57-101616 | 7/1983 |
| JP | 59-70814 | 5/1984 |
| JP | 11-200894 | 7/1999 |
| JP | 11-247999 | 9/1999 |
| JP | 2000-257862 | 9/2000 |
| JP | 2002-339706 | 11/2002 |
| JP | 2005-076802 | 3/2005 |
| JP | 2006-017074 | 1/2006 |
| WO | 00/70192 | 11/2000 |

OTHER PUBLICATIONS

European Search Report dated Feb. 3, 2009 in European Application No. 06782810.3.

* cited by examiner

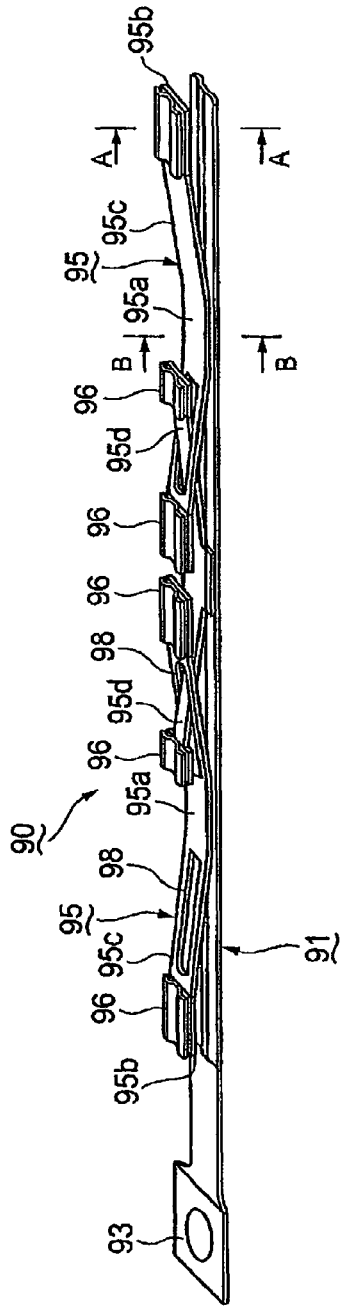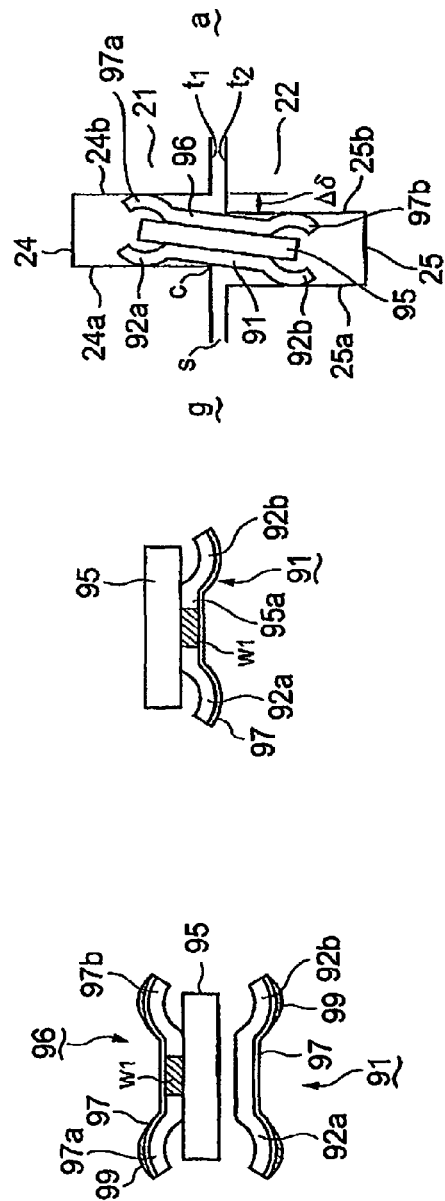

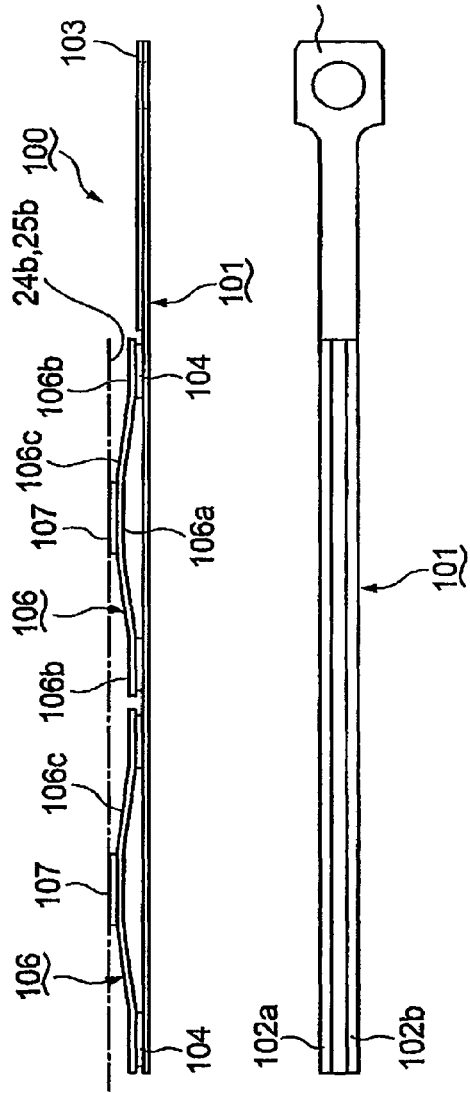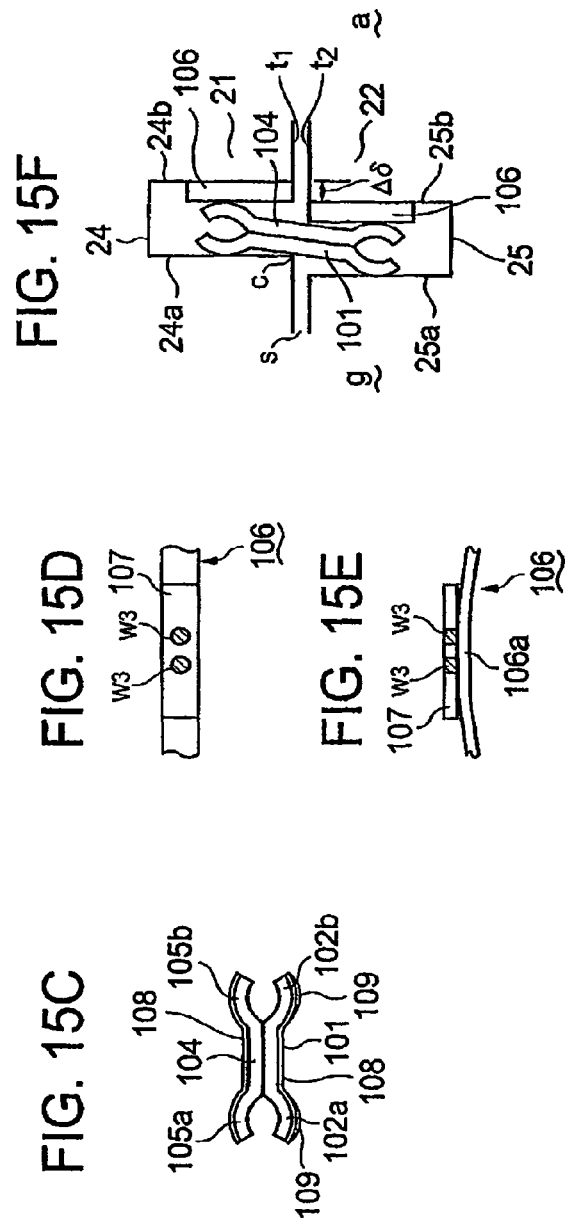

SEAL STRUCTURE FOR GAS TURBINE COMBUSTOR

This application is a Divisional of U.S. application Ser. No. 11/990,769, filed Mar. 11, 2008 now U.S. Pat. No. 7,788,932, which is a national stage application of International application No. PCT/JP2006/316197, filed Aug. 11, 2006.

BACKGROUND OF THE INVENTION

I. Technical Field

The present invention relates to a seal structure between tail ducts of a plurality of combustors which are arranged in the circumferential direction of a gas turbine, in the connection between the outlet ends of the tail ducts and an inlet nozzle of the gas turbine, and in particular to a simple seal structure for sealing between opposed surfaces of adjacent flanges of the outlet ends of the tail ducts in order to prevent compressed air on the high pressure side from entering into a combustion gas passage.

II. Description of Related Art

Referring to FIG. 17 which is a sectional view illustrating a commonly known configuration of a premix combustion type gas turbine combustor, a gas turbine 01 is mainly composed of a compressor 02, gas turbine combustors 03 and a gas turbine 04. The combustors 03 are installed in a wheel compartment 05 having a hollow space defined between the compressor 03 and the turbine 04, each being composed of an inner duct 06 defining therein a combustion zone, a tail duct 07 coupled to the front end of the inner duct 06, an outer duct 08 arranged, concentric with the inner duct 06, a pilot nozzle 09 extended from the rear end of the inner duct 06 on the axial line of the inner duct, a plurality of main nozzles 010 arranged around the pilot nozzle 09 at equal circumferential intervals, a bypass duct 011 coupled to a side wall of the bypass duct 07 and opened to the wheel compartment 05, a bypass valve 012 connected in the bypass duct 011, and a bypass valve changing mechanism 013 for adjusting the opening degree of the bypass valve 012.

In the above-mentioned configuration, the compressed air compressed in the compressor 02 flows into the wheel compartment 05 (as indicated by a void arrow in the figure), then is turned by an angle of about 180 deg. (as indicated by the solid line arrow in the figure) after passing through an annular space defined between the outer peripheral surface of the inner duct 06 and the inner peripheral surface of the outer duct 08, and is finally led into the inner duct 06 at the rear end of the latter. Next, the compressed air is mixed with fuel injected from a pilot burner (which is not shown) so as to carry out premixed combustion, and accordingly, a high pressure and high temperature combustion gas is produced. The thus produced combustion gas is led through the tail duct 07 so as to be discharged from the outlet end of the latter in order to drive the turbine 04. It is noted that a part of the compressed air is fed into the tail duct 07 and the like from the wheel compartment 05 by way of the bypass duct 011 in order to regulate the density of the combustion gas.

Further, there are shown a flange part 019 connecting between the combustion gas outlet end of the tail duct 07 and a turbine nozzle part 018, first stage rotor blades 016 attached to a turbine main shaft 015, first stage stator vanes 017A provided just downstream of the turbine nozzle part 018 and second stage stator vanes 017B. The compressed gas flows through a space surrounding the outer periphery of the flange part 019 at a pressure higher than the combustion gas passing through the inside of the flange part 019, and accordingly, sealing is required in order to prevent the compressed gas from entering into the inside of the flange part 019.

For example, Japanese Patent Laid-Open No. 2000-257862 discloses a seal structure for the outlet flange part 019 of the tail duct of the gas turbine combustor. This seal structure is used for sealing the inner edge side and the outer edge side of opposed parts of the outlet end of the tail duct of the gas turbine combustor and the turbine inlet nozzle, and is adapted to prevent a seal part from being worn due to thermal explanation of flanges provided to the opposed parts so as to prevent deterioration of a sealing function by providing an air passage for introducing cooling air (compressed air) into a combustion gas passage, in the seal part.

Further, Japanese Patent Laid-Open No. 2002-339706 (JP '706) discloses a seal structure between opposed parts of the outlet end parts of the tail duct of a gas turbine combustor and a turbine inlet nozzle or a seal structure between adjacent tail ducts, in which a planar seal assembly composed of a textile-like or nit-like metal fabric and a sheet-like nonporous high-temperature resistant metal shim arranged on the high pressure side of the metal fabric, is inserted in a slot formed in a seal part in order to enhance the seal performance.

FIG. 18A to FIG. 18C show the seal structure of the outlet end part of the tail duct. That is, FIG. 18A is an explanatory view illustrating the seal structure as viewed from the turbine nozzle side, FIG. 18B is a view illustrating the seal structure as viewed in the direction of the arrows b in FIG. 18A, and FIG. 18C is an enlarged view illustrating a part c in FIG. 18B. A plurality of combustors are arranged in the number from 16 to 18, circumferentially around the gas turbine body, and there are shown outlet end parts 07 of the tail ducts of the combustors, flanges 019 provided at the outlet end parts of the tail ducts, for connection to a turbine nozzle part 018, combustion gas passages g extended from the tail ducts 07 to the turbine nozzle part 018, and compressed air passages a defined between the adjacent tail ducts 07 within the wheel chamber 05.

The seal structure between the outlet end parts 07 of each adjacent tail ducts has such a configuration that a planar seal assembly 023 disclosed in JP '706 is inserted in recess grooves 24, 25 which are formed spanning between opposed surfaces t1, t2 of the outlet flanges 19 in order to seal between the flanges 019 of the tail ducts. It is noted that as shown in FIG. 18A, the seal assembly 023 has a handle 023a for gripping the seal assembly 023 during the handling of the seal assembly 023.

The tail duct part of the gas turbine combustor is presented in a high temperature atmosphere, and accordingly, a seal member itself requires a certain degree of rigidity in order to hold its effective sealing function under the high temperature atmosphere. However, with this high rigid seal member, it is likely to cause a slight gap between a flange of an equipment and a seal surface.

Further, due to a thermal deformation, relative displacements in all directions, that is, a circumferential direction, a radial direction and an axial direction occur. However, there has not yet been found a heat resistant and low rigid seal member which can follow up the above-mentioned relative displacements.

Further, due to vibration, the seal member is lifted up from the associated seal surface, resulting in occurrence of problems, that is, an inferior sealing effect, abrasion of the seal surface, an aging effect such as deterioration of the seal surface caused by contact therewith due to long time use, gradual increase of leakage at the seal surface and the like.

In particular, opposed surfaces of the flanges of the adjacent tail ducts are subjected to a remarkable relative displacement in the axial direction of the tail duct (in the direction indicated by the arrow b shown in FIG. 19), being caused by thermal deformation and vibration. As shown in FIG. 19, the opposed surfaces t1, t2 of the two flanges 021, 022 of the adjacent tail ducts remarkably cause a relative displacement $\Delta\delta$ in the axial direction b of the tail duct, due to thermal deformation, and since the combustion gas g around the outlets of the tail ducts has a pressure which is lower than that of the compressed air a in the wheel compartment arranged outside of the tail ducts by a value corresponding to a pressure loss, and accordingly, due to the pressure difference therebetween, the conventional seal member 023 is pressed against the inner surfaces 024a, 025a, on the combustion gas passage side, of recess grooves 024, 025 which are formed spanning between the opposed surfaces t1, t2.

In this case, the conventional seal member 023 would cause a gap between itself and the seal surface 025a due to the relative displacement $\Delta\delta$, resulting in occurrence of leakage r.

It is noted that, in the case of occurrence of the leakage between the tail ducts of the combustors, the compressed air a in the wheel compartment 05 arranged outside of the tail ducts is mingled with the combustion gas g flowing through the tail ducts so as to increase the air mixing ratio, resulting in a temperature rise, and accordingly, there would be caused problems of an increase in emission of NOx, deterioration of combustion efficiency, and the like.

SUMMARY OF THE INVENTION

The present invention is devised in view of the above-mentioned problems inherent to the conventional technology, accordingly, an object of the present invention is to provide a seal structure for sealing opposed surfaces of the flanges of adjacent tail ducts, which can ensure a satisfactory sealing function for a long time without occurrence of leakage due to a thermal deformation under a high temperature atmosphere of gas turbine combustors, abrasions and aged deterioration due to vibration, or a leakage caused by a lift-up of a seal member due to vibration.

To this end, according to the present invention, there is provided a seal structure for adjacent tail ducts of combustors, provided therebetween in the connection between outlet end parts of the tail ducts of a plurality of combustors which are arranged in the circumferential direction of a gas turbine, wherein recess grooves are formed respectively in opposed surfaces of flanges of the adjacent tail ducts at the outlet end parts thereof, a seal assembly composed of a long planar seal member and a leaf spring juxtaposed with the seal member is inserted in the recess grooves, the seal member has continuous beads at opposite side end parts of one side surface thereof, the beads are set on the opposed surfaces of the flanges, striding therebetween within the recess grooves, being faced toward the surfaces of the recess grooves on the combustion gas passage side, the leaf spring is set against the seal member on the compressed air side within the recess grooves, and accordingly, the beads are pressed against the surfaces of the recess grooves on the combustion gas passage side by a resilient force of the leaf spring.

With the configuration of the seal structure according to the present invention, due to the provision of the continuous beads at opposite end parts of one surface of the seal member in the seal assembly, as shown in FIG. 1, in such a case that the flanges 21, 22 of the adjacent tail ducts are subjected to a relative displacement $\Delta\delta$ due to vibration or thermal deformations of the tail ducts, since the beads 31a, 31b are present in the seal assembly according to the present invention, the seal assembly does never make into contact with corners c, and further, since the seal member 23a is applied thereto with the resilient force of the leaf spring 23b so as to hold the beads 24a, 24b in such a condition that they are pressed against the inner surfaces 24a, 25a on the combustion gas passage side, thereby it is possible to keep a sealing condition between the opposed surfaces t1, t2 without the seal member being lifted up by vibration. Thereby it is possible to prevent occurrence of a leakage of an air stream between the opposed surfaces from the compressed air passage side a to the combustion gas passage g side.

It is noted that the seal member and the leaf spring may be either jointed together or separated from each other. In either case, the sealing function can be satisfied. In the case of them joined together, they are joined by welding, soldering or the like. Further, in the case of them joined together, with the provision of a handle attached to either of them, they can be pulled out, and alternately, they can be readily pulled out with the use of a pull-out jig. In the case of them separated from each other, it is required to provide handles to both of them, or to use pull-out jigs for removing both of them. However, it would be required to replace only one of them with new one upon replacement, thereby it is possible to facilitate the replacement.

In the seal structure according to the present invention, preferably, the above-mentioned seal member is composed of a plurality of superposed strips defining therein a hole for inserting therein a core member, the insertion hole being formed in the superposed strips in the superposing direction thereof. With this configuration, the seal member can have a flexibility so as to readily follow up a relative displacement of the flanges defining the opposed surfaces due to a thermal deformation, meanderings and deformations of the flanges in the longitudinal direction of the seal member due to vibration or the like.

Further, the above-mentioned superposed strips may be formed from rod-like members which have a bent contour so as to define therein the hole for inserting therein the core member. With this configuration, the seal member can have a flexibility so as to readily follow up meanderings of the flanges in the longitudinal direction of the seal member due to vibration, and the seal member itself may have a spring effect, thereby the seal member can be lightweight. Further, with the lightweight seal member, the inertial force of the seal member caused by vibration can be reduced, thereby it is possible to prevent the seal member from being lifted up from the associated seal surface.

Further, the beads or the inner surfaces of the recess grooves on the combustion gas passage side, with which the beads are made into contact, may be coated thereover with a wear-resistance film so as to reduce the abrasion of the beads and the inner surfaces on the combustion gas passage side, which are pressed against each other. Further, the friction can be lowered by coating the wear-resistant film, when the seal assembly is inserted in the grooves, and accordingly, it can be readily inserted into the grooves. There may be used $Cr_2C_3$, WC, $MoS_2$ or the like as a material for the wear-resistant film.

Further, for example, the leaf spring according to the present invention may be corrugated so as to have convexities and concavities which are faced toward the seal member juxtaposed with the leaf spring. Alternatively, the leaf spring may be composed of a planar seat plate and a plurality of cantilever type spring members each having one end part lifted up from the seat plate and the other end part joined to the seat plate. Thus, with the provision of the plurality of cantilever type spring members which constitute the leaf springs, the seal assembly can be readily assembled, and the resilient displacement thereof can be readily increased so as to follow up a large degree of deformation. Further, with this configuration, the lifted-up end parts thereof may be rounded in order to reduce occurrence of being caught upon the insertion thereof in the recess grooves.

Alternatively, the leaf spring according to the present invention, is composed of, for example, a planar seat plate, and a plurality of leaf springs each having free end parts at both ends thereof, being lifted up from the seat plate, and a center part joined to the seat plate.

With the above-mentioned configuration, since each spring member is left-right-symmetric with respect to the center part thereof, loads can be applied, left-right symmetrically, that is, no unbalance load is applied to the joined part thereof, thereby it is possible to exhibit such an advantaged that the joint part can be restrained from being broken.

Further, the leaf spring may be composed of a base portion and a plurality of spring members each having leg portions arranged in a V-like shape, in a pair, which are provided on the opposite side parts of the base portion, the leg portions making contact with the inner surfaces, on the combustion gas passage side, of the recess grooves, striding between the opposed surfaces of the flanges.

With configuration as stated above, a sealing load may be evenly loaded upon seal surfaces defined by the inner surfaces, on the combustion gas passage side, of the recess grooves, through the intermediary of the beads.

Further, according to the present invention, the leaf spring has opposite end parts lifted up so as to serve as free end parts, and a center part joined to the seal member, support plates are provided on the opposite end parts, each of the support plates having, on the opposite side end parts, rounded cross-sectional shape beads which are arranged in the recess grooves formed in the opposed surfaces of the flanges of the tail ducts, striding between the opposed surface, and elongated holes are formed in inclined parts of the leaf spring, except the opposite end parts and the center part, in the longitudinal direction of the leaf spring, the adjacent leaf springs being inserted in the elongated holes so as to overlap the free end parts thereof with each other in order to arrange the leaf springs at close pitches.

With this configuration, the seal member may be formed in a thin planar shape so as to have a flexibility in the longitudinal direction thereof in order to follow up a deviation caused by deformations and thermal explanations of the opposed surfaces of the flanges of the tail ducts, and to allow the seal member to be lightweight, and accordingly, the inertial force of the seal member caused by vibration can be reduced so as to restrain the leaf spring from being lifted up. Further, the number of joint parts in the center parts of the leaf springs can be increased on the seal member, so as to increase the number of pressing points for applying resilient forces to the seal member, thereby it is possible to further enhance the sealing function over the longitudinal length of the seal member.

Further, should the opposed surfaces of the flanges of the tail ducts be deviated from each other due to thermal deformations thereof so that the leaf spring makes contact with corners of the recess grooves formed in the opposed surfaces, there would be causes a risk of occurrence of a dent, an eccentric abrasion or a variation in depression margin. However, due to the provision of the support plats at the opposite end parts of each leaf spring which is therefore prevented from making direct contact with the corners of the recess grooves, the above-mentioned risk would never occur, thereby it is possible to keep an uniform resilient force applied to the seal member. Further, even though the support plates are inclined due to deviations of the opposed surfaces of the flanges, the rounded beads provided on the support plates can smoothly follow up the inclined support plates so as to prevent the leaf springs from being exerted thereto with an eccentric load, and accordingly the resilient force of the leaf spring adapted to be applied to the seal member can be maintained, thereby it is possible to prevent the sealing function of the beads of the support plates from being deteriorated.

Further, the seal member and the leaf spring may be formed being separated from each other, the leaf spring having lifted up free end parts, and a center part which is attached to the inner surfaces, on the combustion gas passage side, of the recess grooves formed in the opposed surface of the flanges of the tail ducts, through the intermediary of an attaching plate for welding, and the seal member may be provided in the parts thereof which are opposed to the opposite end parts of the leaf spring, with support plates having, at the opposite side end parts thereof, rounded cross-sectional shape beads which are arranged in the recess grooves formed in the opposed surfaces of the flanges of the tail ducts, and which stride between the opposed surfaces.

With this configuration, similar to the afore-mentioned configuration, the seal member may have a thinned wall thickness, and have a flexibility and a light weight, and since the seal member can be pressed by the opposite end parts of the leaf spring, the number of positions for pressing the seal member can be increased, thereby it is possible to enhance the sealing function and to surely restrain the seal member from being lifted up by vibration or the like. Further, with the separation of the seal member from the leaf spring, the seal assembly may have a simple structure, and since the opposite end parts of the leaf spring are made into contact with the rounded beads of the support plates, the opposite end parts of the leaf spring can be prevented from making one-side contact, thereby it is possible to prevent occurrence of a dent and an eccentric abrasion, or a variation in depression margin due to plastic deformation.

It is noted in the above-mentioned configuration according to the present invention, that is, in such a configuration that the leaf spring is attached to the seat plate so that one or each of both end parts thereof is lifted up from the seal plate for serving as a free end part, the leaf spring may be attached at one or each of the opposite end parts with a support plate formed with the beads having the above-mentioned configuration. With this configuration, even though the opposed surfaces of the flanges of the tail ducts are deviated due to thermal deformations, it is possible to prevent the leaf spring from making contact with the corners of the recess grooves formed in the opposed surfaces so as to be dented or eccentrically worn, and also to prevent the leaf spring from being plastically deformed so as to cause a variation in depression margin.

According to the configuration of the seal structure in the present invention, the recess grooves are formed respectively in the opposed surfaces of the flanges of the tail ducts, which are adjacent to each other at the outlet ends of the tail ducts, the seal assembly composed of the long planar seal member and the leaf spring juxtaposed with the seal member, is inserted in the recess grooves, the seal member having, at the opposite side end parts of one of the side surfaces thereof, the continuous beads which are arranged striding between the opposite surfaces of the flanges of the tail ducts and facing toward the combustion gas passage side within the recess grooves, the leaf spring is arranged on the compressed air side of the seal member within the recess grooves, the beads being pressed against the inner surfaces, on the combustion gas passage side, of the recess grooves by the resilient force of the leaf spring, and accordingly, the resilient force of the leaf spring is effectively exerted to the seal member, thereby it is possible to always maintain a satisfactory sealing function at seal surfaces defined by the beads and the inner surfaces, on the combustion gas passage side, of the recess grooves even though a relative displacement is caused between the opposed surface of the flanges at the outlet ends of the tail ducts due to vibration or a thermal deformation.

BRIEF DESCRIPTION OF THE DRAWINGS

FIG. 14A is a perspective view illustrating a seal assembly in a seventh embodiment of the present invention, FIG. 14B is a sectional view a along line A-A in FIG. 14A;

FIG. 14C is a sectional view along line B-B in FIG. 14A;

FIG. 14D is a view for explaining a sealing function of the seventh embodiment of the present invention;

FIG. 15A is an elevation view illustrating an eighth embodiment of the present invention;

FIG. 15B is a plan view illustrating the eighth embodiment of the present invention;

FIG. 15C is a transverse side view illustrating a seal plate in the eighth embodiment of the present invention;

FIG. 15D is a plan view illustrating a part of the eighth embodiment of the present invention;

FIG. 15E is an elevation view illustrating a part of the eighth embodiment of the present invention;

FIG. 15F is a view for explaining a sealing function of the eighth embodiment of the present invention;

DETAILED DESCRIPTION OF THE INVENTION

A detailed explanation will be hereinbelow made of the present invention in the form of preferred embodiments shown in the accompanying drawings. It is noted here that dimensions, materials, relative positions of components explained in these embodiments are merely exemplified, and accordingly, should not be intended to limit the scope of the present invention thereto unless otherwise specified.

Embodiment 1

Figure 2:
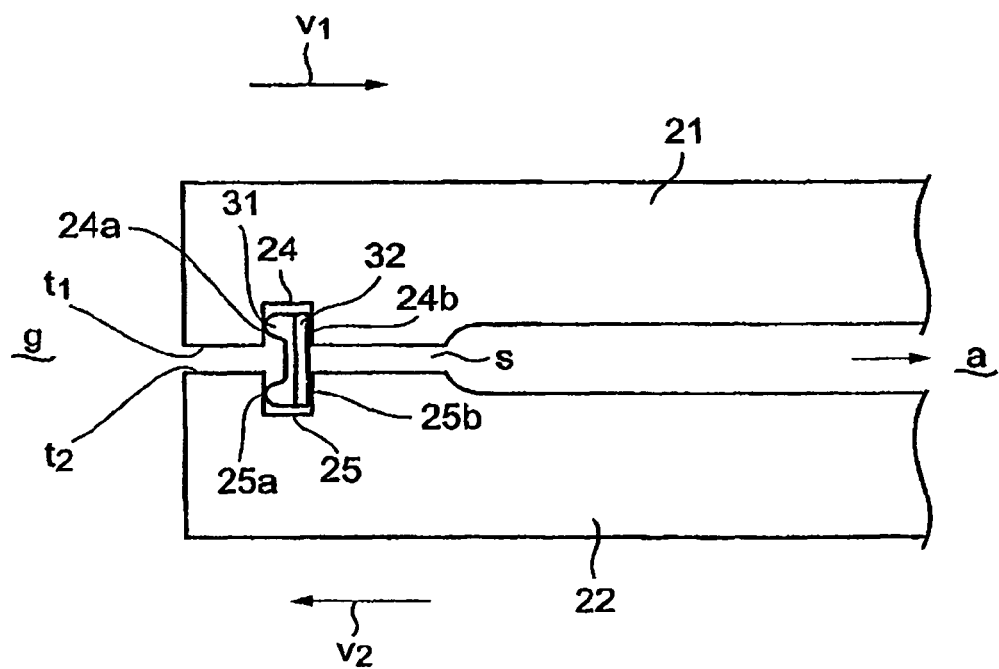
FIG. 2 is a vertically sectioned view illustrating a first embodiment of the present invention.
Figure 3:
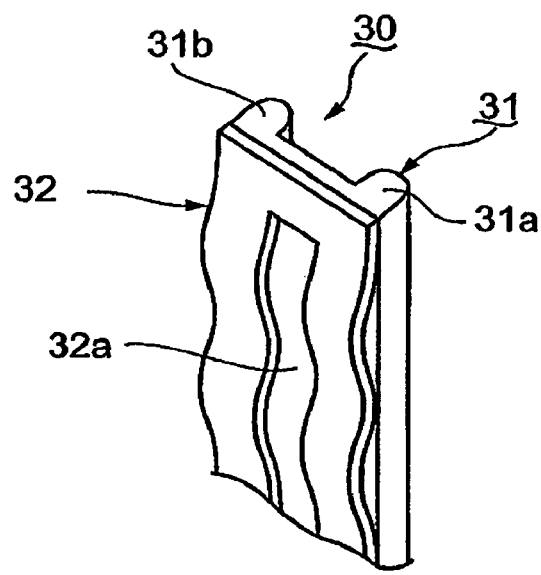
FIG. 3 is a perspective view illustrating a seal assembly in the first embodiment of the present invention.

Referring to FIGS. 2 and 3 which show a first embodiment of the present invention; there are shown flanges 21, 22 which are provided in combustion gas outlet end parts of adjacent tail ducts in the connection between the tail duct and an inlet nozzle of a turbine downstream of the tail ducts, and a seal assembly 30 according to the present invention is inserted in recess grooves 24, 25 formed in opposed surfaces t1, t2 of the flanges 21, 22, spanning between the recess grooves 24, 25. The seal assembly 30 is composed of a long length seal plate 31 made of a metal, and a leaf spring 32 made of a metal, which are joined to each other by blazing or the like.

The seal plate 31 is formed on opposite side parts thereof with continuous beads 31a, 31b extended in the longitudinal direction, and meanwhile, the leaf spring is formed therein with an elongated hole 32a in the longitudinal direction.

Figure 18A:
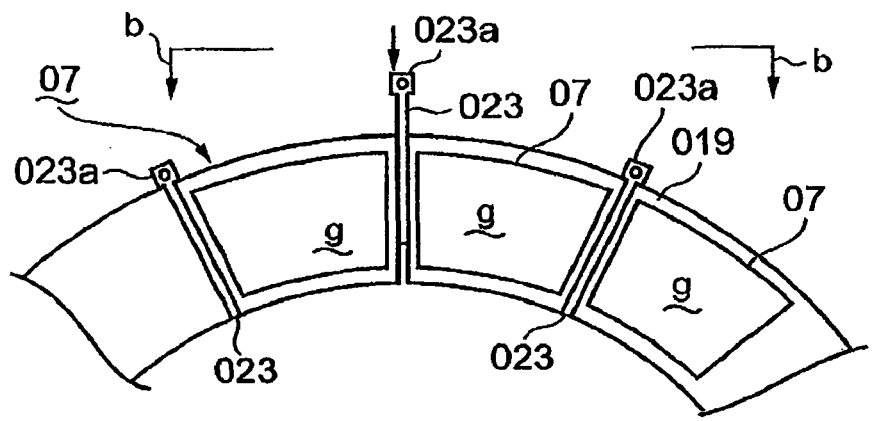
FIG. 18A is an elevation view illustrating outlet end parts of tail ducts of conventional gas combustors in a gas turbine.
Figure 18B:
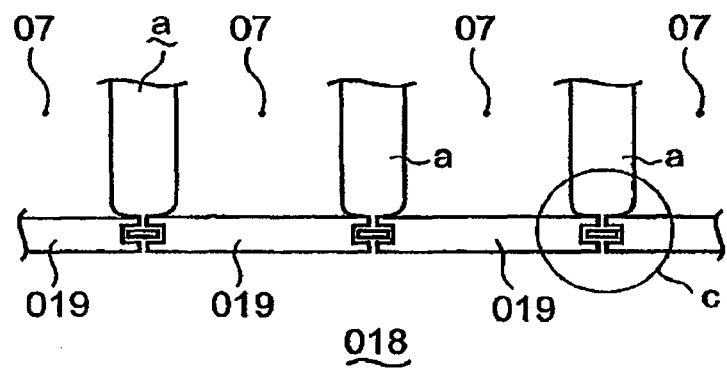
FIG. 18B is a view illustrating the outlet end parts of the tail ducts as viewed in the direction of the arrow b in FIG. 18A.
Figure 18C:
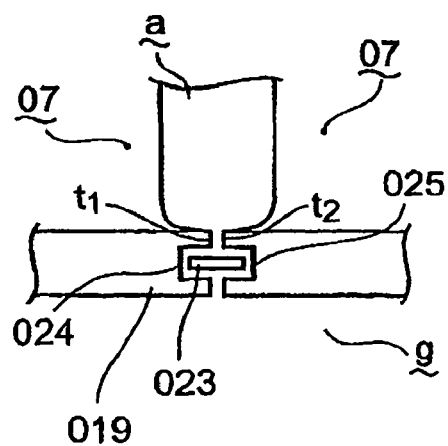
FIG. 18C is an enlarged view illustrating a part c in FIG. 18B.

In the seal assembly 30, the leaf spring 32 is located within the recess grooves 24, 25 at the inner surface 24b, 25b on the compressed air a side so as to press, with its resilient force, the bead 31a of the seal plate 31 against the inner surface 24a, on the combustion gas passage side, of the recess groove 24, and the bead 31b against the inner surface 25a, on the combustion gas passage side, of the recess groove 25 in order to seal a gap between the opposed surfaces t1, t2. As shown in FIG. 18C, the seal assembly 30 is inserted in the recess grooves 24, 25 formed in the opposed surfaces t1, t2 of the flanges 019 at the outlet ends of the adjacent tail ducts 07, over the entire distance between the grooves 24, 25.

Figure 1:
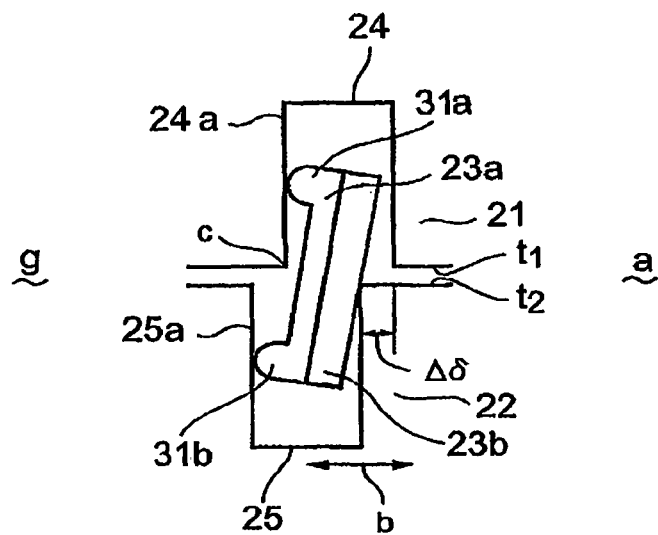
FIG. 1 is a view for explaining a sealing function of a seal assembly according to the present invention.
Figure 19:
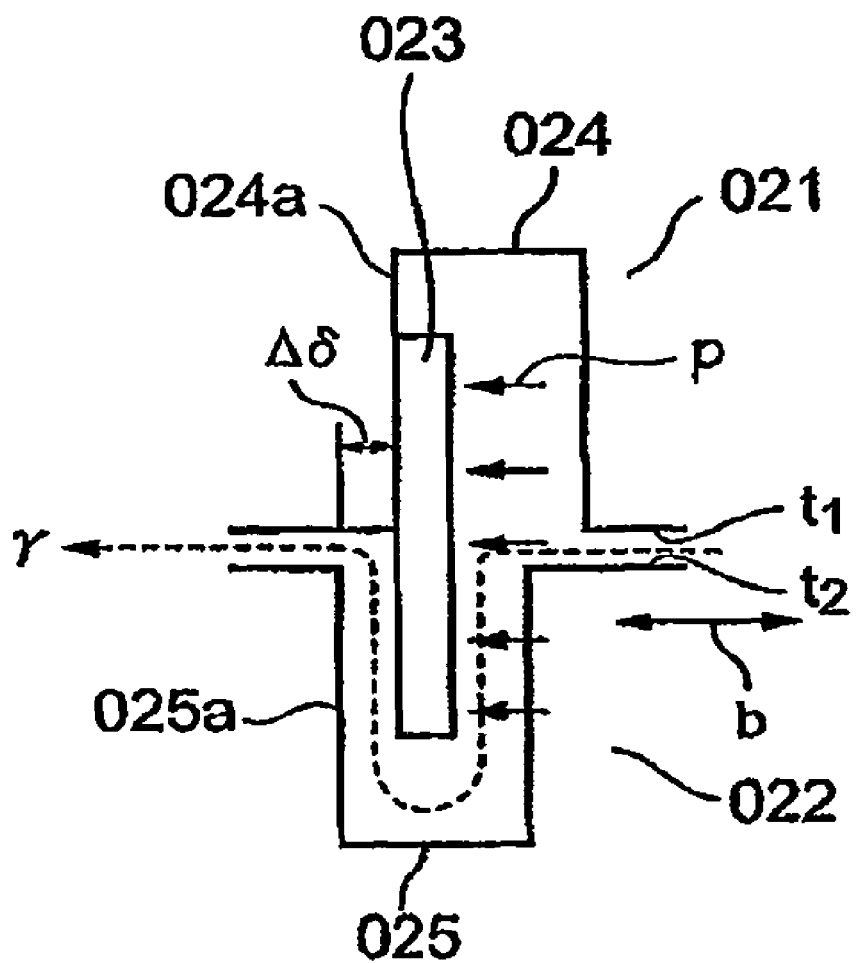
FIG. 19 is a view illustrating a seal function of a conventional seal assembly.

With this configuration, even though vibration v1 and vibration v2 are excited through the flanges 21, 22 in directions opposite to each other, or even though a relative displacement Δδ is caused in the direction of the arrow b due to a thermal deformation, as shown in FIG. 19, the beads 31a, 31b are pressed against the seal surfaces 24a, 25a by the resilient force of the leaf spring 32, as shown in FIG. 1, and accordingly, the beads 31a, 31b are never separated from the seal surfaces 24a, 25b, thereby it is possible to maintain a satisfactory sealing effect. Further, in the first embodiment, a sufficient sealing effect can be obtained by the seal assembly 30 having a simple structure.

Embodiment 2

Figure 4:
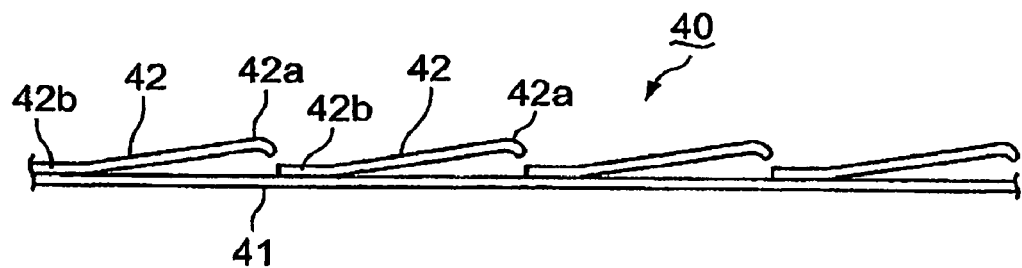
FIG. 4 is an elevation view illustrating a leaf spring in a second embodiment of the present invention.

Referring to FIG. 4 which shows a second embodiment wherein a variant form of the leaf spring incorporated in the seal assembly according to the present invention will be explained, a leaf spring 40 in the second embodiment is composed of a planar seat plate 41, and a plurality of leaf springs 42 each having one end part 42a lifted up from the seat plate 41 so as to serve as a free end part, and the other end part 42b joined to the seat plate 41 by riveting, welding or the like.

It is noted that the one end part 42a of the leaf spring 42, serving as the free end part, is rounded so as to be prevented from being caught upon insertion of the seal assembly in the recess grooves 24, 25.

In the second embodiment, due to the provision of the plurality of leaf springs 42, the seal assembly can be readily assembled, and the degree of spring displacement can be simply increased so as to follow up a large deformation.

Embodiment 3

Figure 5:
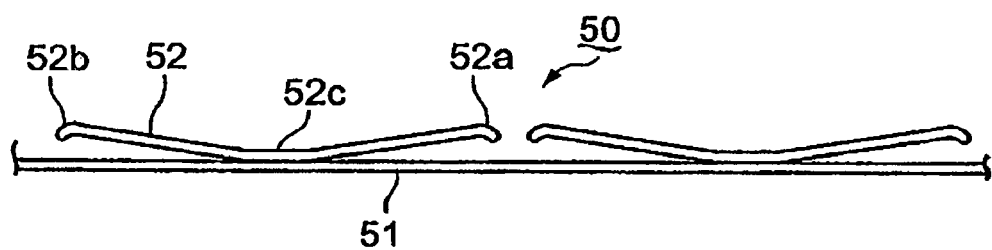
FIG. 5 is an elevation view illustrating a leaf spring in a third embodiment of the present invention.

Referring to FIG. 5 which shows a third embodiment of the present invention, explaining a further variant form of the leaf spring incorporated in the seal assembly according to the present invention, a leaf spring 50 in the third embodiment is composed of a planar seat plate 51 and a plurality of leaf springs 52 each having opposite end parts 52a, 52b which are lifted up from the seat plate 51 so as to serve as free end parts, and a center part 52c jointed to the seat plate 51. It is noted that the opposite end parts 52a, 52b which are lifted up so as to serve as free end parts, are rounded, similar to the second embodiment.

With the configuration of the third embodiment, in addition to the advantages exhibited by the second embodiment, spring forces are applied to the opposite end parts of the leaf spring 52, symmetrically at the same time when the seal assembly is inserted in the recess grooves in the flanges to be sealed, and accordingly, no one-sided force is exerted to the center part 52c, therefore it is possible to obtain such an advantaged that the center part 52c can therefore hardly be peeled off.

Embodiment 4

Figure 6:
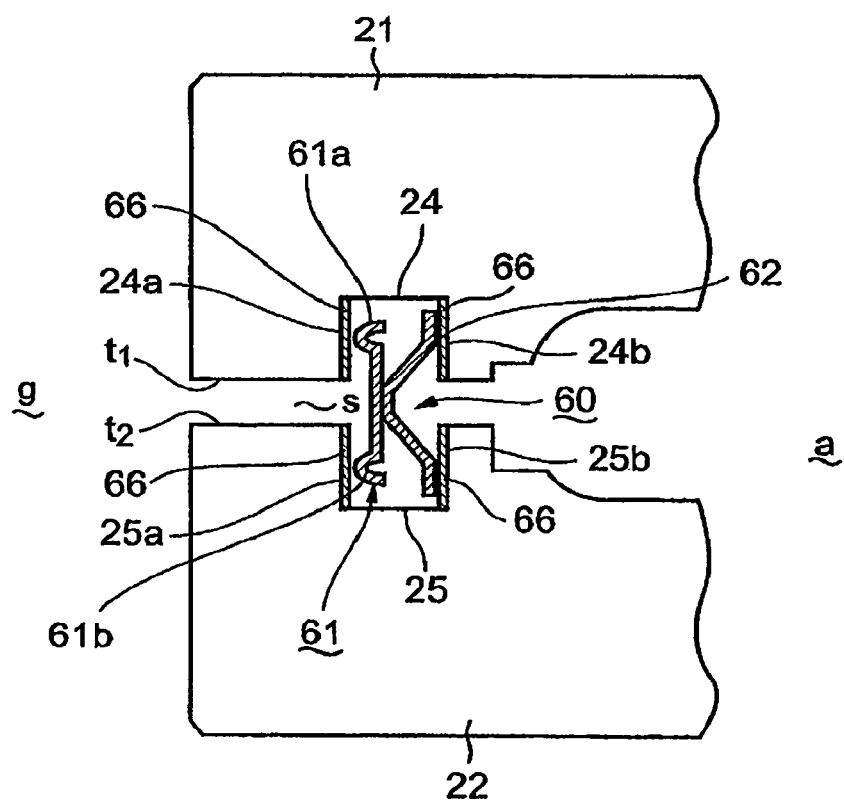
FIG. 6 is a sectional view illustrating a fourth embodiment of the present invention.
Figure 7:
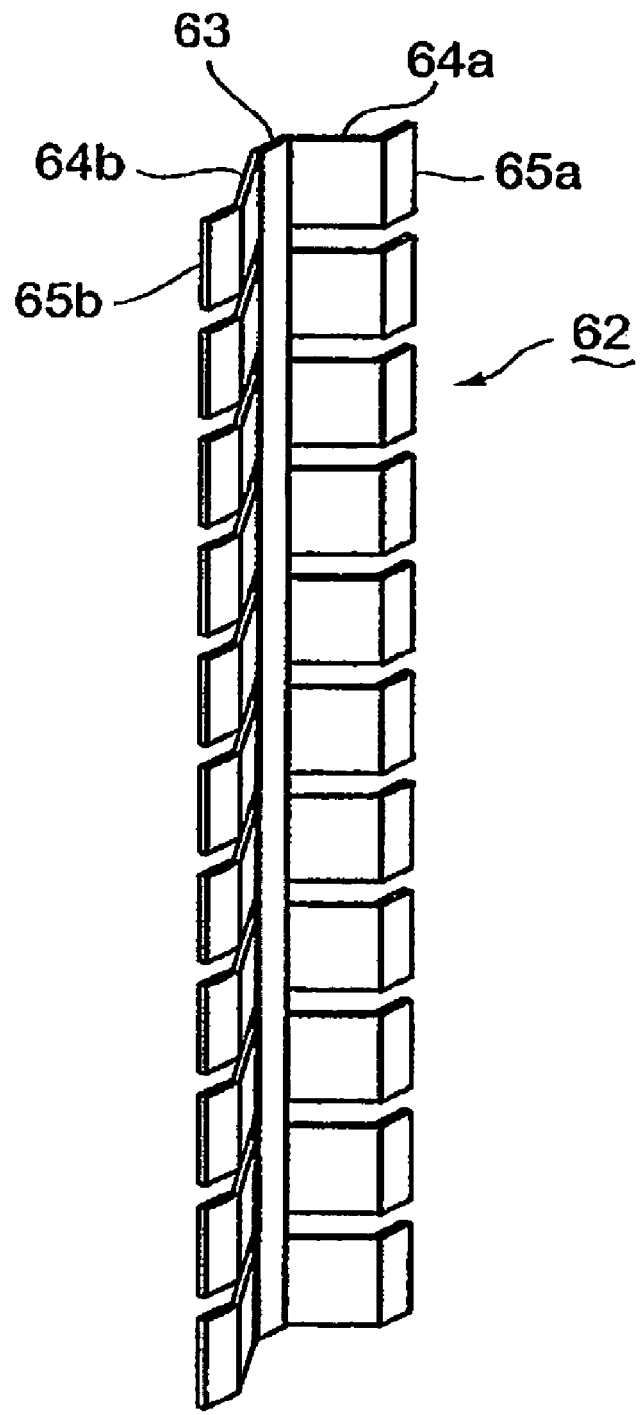
FIG. 7 is a perspective view illustrating a leaf spring in the fourth embodiment of the present invention.

Next, explanation will be made of a fourth embodiment of the present invention with reference to FIGS. 6 and 7. Referring to FIGS. 6 and 7, a seal assembly 60 in the fourth embodiment, is composed of a seal plate 61 and leaf springs 62 which are integrally incorporated with each other. The seal plate 61 is planar, having curved side end parts so as to form continuous beads 61a, 61b.

The leaf spring 62 is composed of a base portion 63 formed of a single long length plate, leg portions 64a, 64b extended in a V-like shape from the base portion 63, and foot portions 65a, 65b connected to the distal end parts of the leg portions 64a, 64b, the leg portions 64a, 64b being arranged so as to be spaced from each other in the longitudinal direction of the base portion 63. The base portion 63 is joined to the center part of the seal plate 61 so as to be integrally incorporated with the latter.

The seal assembly 60 having the above-mentioned configuration is inserted in the recess grooves 24, 25 formed in the flanges 21, 22. At this stage, the bead 61a of the seal plate 61 is pressed against the inner surface 24a, on the combustion gas passage side, of the recess groove 24 by the resilient forces of the leaf springs 62, and similarly, the bead 61b is pressed against the inner surface 25a, on the combustion gas passage side, of the recess groove 25, thereby to seal the gap S between the opposed surfaces t1, t2 of the flanges 21, 22.

It is noted that the inner surfaces 24a, 25a, on the combustion gas passage side, and the inner surfaces 24b, 25b, on the compressed gas passage side, of the recess grooves 24, 25 are coated thereover with a wear-resistant film 66 which is made of a hard film material such as $Cr_2C_2$, WC, $MoS_2$ or the like. The foot portions 65a, 65b which are planar, are adapted to make contact with the inner surfaces 24b, 25b.

In the fourth embodiment having the above-mentioned configuration, since the seal assembly 60 is integrally formed, it can be readily inserted in the recess grooves 24, 25, and since the leaf springs 62 are arranged at close pitches, the resilient forces of the leaf springs 62 are evenly applied to the seal plate 61, and accordingly, are evenly applied to the seal surfaces of the beads 61a, 61b. The joined area between the base portion 63 and the seal plate 61 can be reduced, that is, even though the base portion 61 may be joined to the seal plate 61 at only one end part, or even though the seal plate 61 may not always be joined to the leaf springs 62, a satisfactory sealing function can be obtained.

Embodiment 5

Figure 8:
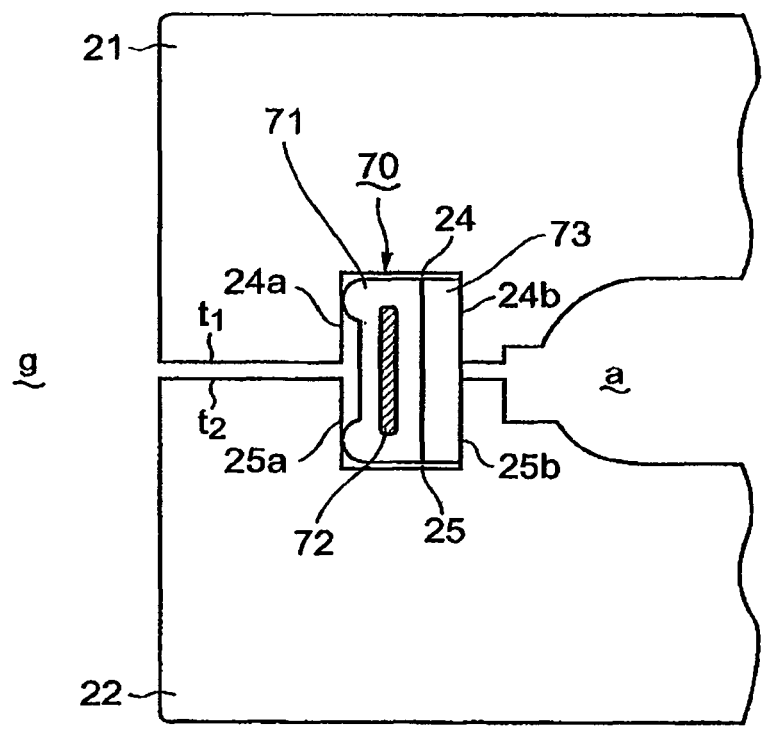
FIG. 8 is a sectional view illustrating a fifth embodiment of the present invention.
Figure 9:
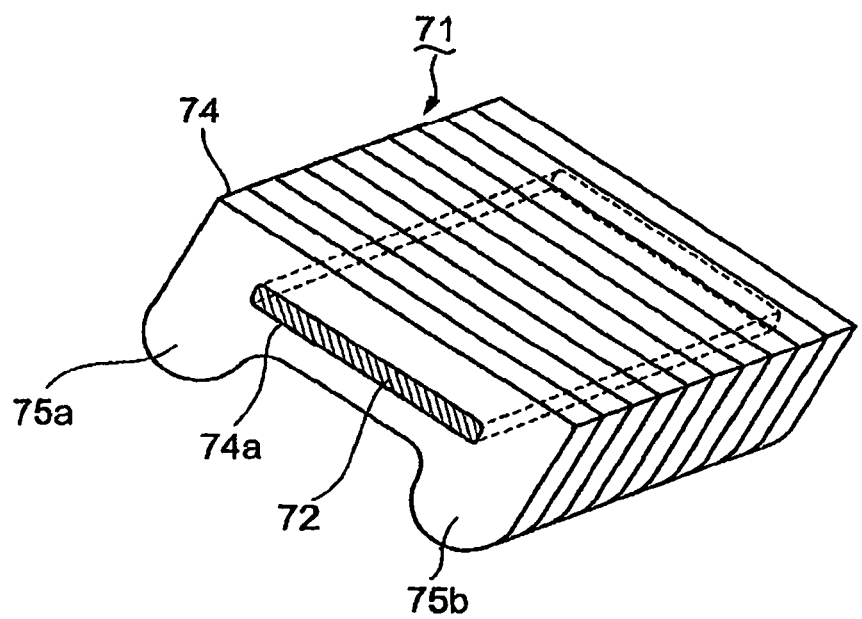
FIG. 9 is a perspective view illustrating a seal member in the fifth embodiment of the present invention.
Figure 10:
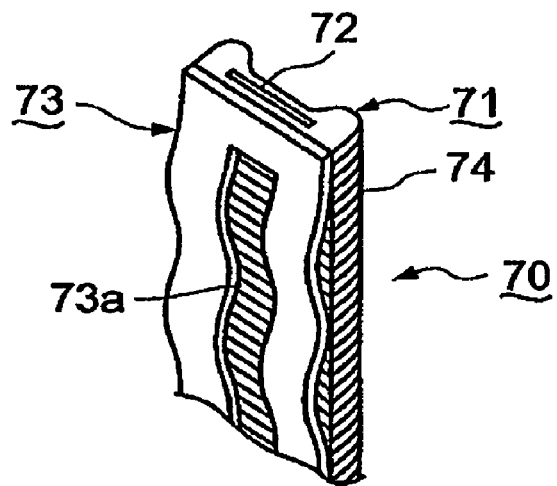
FIG. 10 is a perspective view illustrating a seal assembly in the fifth embodiment of the present invention.

Next, explanation will be made of a fifth embodiment of the present invention with reference to FIGS. 8 to 10. Referring to FIGS. 8 to 10, a seal assembly 70 in the fifth embodiment is composed of a seal plate 71 formed of a stack of several thin strips 74 superposed one over another, and a leaf spring 73. The stack of the strips 74 is formed therein with an elongated hole 74a for inserting a core member 72 therein, that is, the core member 72 is inserted into the elongated hole 74a. Further, the leaf spring 73 is corrugated so as to define convexities and concavities with respect to the seal plate 71 juxtaposed to the leaf spring 73, similar to the first embodiment as shown in FIG. 3. Further, the superposed strips 74 are formed at their opposite side end parts with beads 75a, 75b, and accordingly, when the seal plate 71 is inserted in the recess grooves 24, 25 which are formed in the opposed surfaces t1, t2 of the flanges 21, 22 of the adjacent tail ducts, spanning therebetween, the beads 75a, 75b are pressed against the inner surfaces 24a, 25b on the combustion gas passage g side by the resilient force of the leaf spring 73 so as to serve as seal surfaces with respect to the inner surfaces 24a, 25a.

In the fifth embodiment, since the seal plate 71 is composed of the several strips 74, the seal member can have a flexibility so as to readily follow up a relative displacement of the flanges which define the opposed surfaces, due to a thermal deformation, deformations or meanderings of the flanges in the longitudinal direction due to vibration.

Embodiment 6

Figure 11:
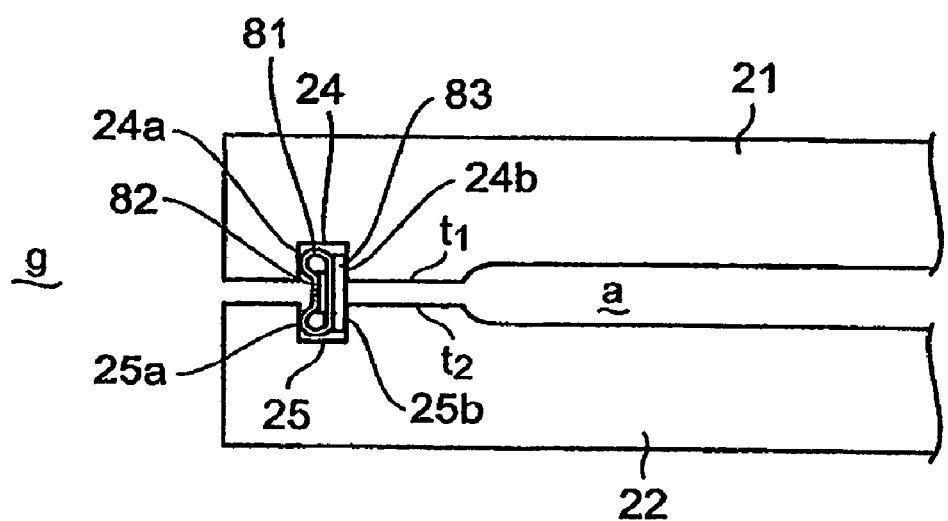
FIG. 11 is a sectional view illustrating a sixth embodiment of the present invention.
Figure 12:
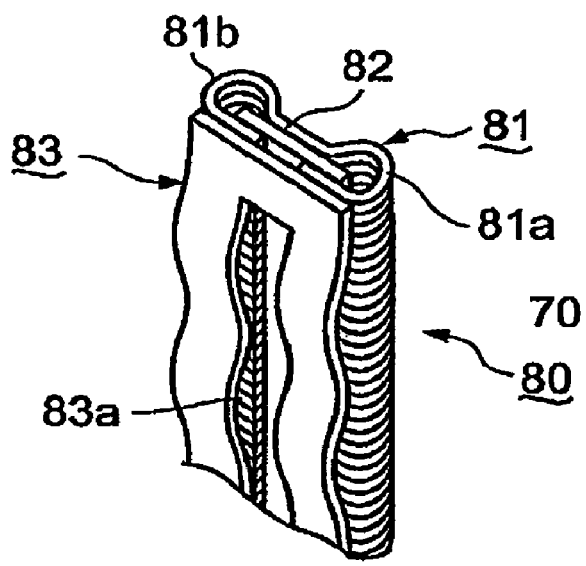
FIG. 12 is a perspective view illustrating a seal assembly in the sixth embodiment of the present invention.
Figure 13:
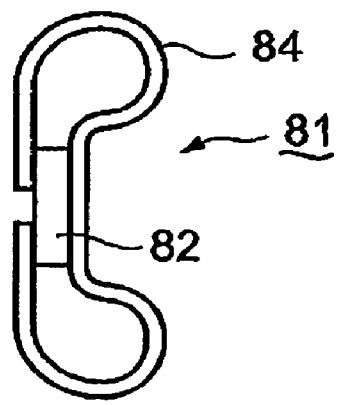
FIG. 13 is an elevation view illustrating a seal member in the sixth embodiment of the present invention.

Next, explanation will be made of a sixth embodiment with reference to FIGS. 11 to 13. Reference to FIGS. 11 to 13, a seal assembly 80 is composed of a seal plate 81 composed of a stack of several superposed strips 84 each of which is formed a curved round bar, a core member 82 inserted into a hollow space of the seal plate 81, and a leaf spring 83 which is joined to the seal plate 81, and which is corrugated so as to define convexities and concavities with respect to the seal plate 81, similar to the fifth embodiment. It is noted that reference numeral 83a denotes an elongated hole formed in the leaf spring 82.

In this sixth embodiment, the seal plate 81 can have a flexibility so as to readily follow up meanderings of the flanges 21, 22 along the longitudinal direction of the seal plate 81, and as well, the seal plate 81 itself can have resilient effect while the seal plate 81 can be lightweight. Further, the lightweight seal plate 81 can reduce its inertial force caused by vibration, thereby it is possible to prevent the seal member from being lifted up from the seal surface.

It is noted in this embodiment that the beads 81a, 81b may be coated over their parts which make contact with the inner surfaces 24a, 25a on the combustion gas passage side or the inner surfaces 24a, 25a may be coated thereover with the wear-resistant film, thereby it is possible to restrain the beads 81a, 81b and the seal surfaces 24b, 25b from being worn, thereby it is possible to maintain the sealing function for a long time.

Embodiment 7

Next, explanation will be made of a seventh embodiment of the present invention with reference to FIGS. 14A to 14D. Referring to FIGS. 14A to 14D, a long length seal plate 91 which is thin plate-like and which is formed on opposite sides of its one side surface with rounded beads 92a, 92b, is inserted in the recess grooves 24, 25, spanning therebetween, as shown in FIG. 14D. Since the seal plate 91 is formed of a thin plate so as to obtain flexibility, and accordingly, can readily follow up deformations and displacements of the opposed flanges 21, 22 of the tail ducts. Further, since it is formed of a thin plate, it can be lightweight, thereby it is possible to restrain the seal plate 91 from being lifted up due to vibration of the seal plate. The seal plate 91 is provided at its one end part with a handle 93 for inserting and pulling the seal assembly 90 in this embodiment into and from the recess grooves 24, 25 formed in the opposed surfaces of the flanges 21, 22.

The seal plate 91 is joined thereto with a plurality of chevron-like flattened leaf springs 95 by spot-welding (w1) the center parts 95 of the leaf springs 95 to the seal plate 91, the leaf springs 95 being arranged in the longitudinal direction of the seal plate 91. Further, the opposite end parts 95b of each of the leaf springs 95 are lifted up from the seal plate 91 and are bent so as to be parallel with the seal plate 91, and further, a support plate 96 is spot-welded (w2) to each of the opposite end parts 95b of the leaf spring. The support plate 96 which is thin plate-like, and is formed on its opposite sides with rounded beads 97a, 97b, similar to the seal plate 91.

The seal plate and the support plates 96 are made of Co base alloy or Ni base alloy, which are heat-resistant, and in particular, they are preferably made of the Co base alloy which is also wear-resistant in a high temperature atmosphere. The seal plate 91 and the support plates 96 are coated over their outer surfaces with a wear-resistant hard film 97 made of $Cr_2C_2$, WC or $MoS_2$ or the like.

The leaf spring 95 has inclined parts 95d formed therein elongated holes 98 into which narrow inclined parts of the leaf springs 95 adjacent to the former leaf spring 95 are inserted.

With the configuration as stated above, as shown in FIG. 14D, in the case of occurrence of a deviation Δδ between the opposed flange surfaces 21, 22 of the tail ducts due to a thermal deformation or the like, the beads 92a, 92b formed on the opposite sides of the seal plate 91 on the surface facing the combustion gas passage g side follow up the above-mentioned deviation so as to continuously make contact with the inner surfaces 24a, 25a, on the combustion gas passage g side, of the recess grooves 24, 25, thereby it is possible to maintain the sealing function. Even though the seal plate 91 is inclined in association with the deviation Δδ, the beads 92a, 92 can follow up any inclined angle of the seal plate 91 since the beads 92a, 92b are rounded, thereby it is possible to maintain a constant pressing force against the flange surfaces 24a, 25a.

Further, since the support plates 95 are fixed respectively to the opposite end parts 95b of the leaf spring 95, even though the leaf spring 95 is inclined due to a deviation caused by a thermal deformation, the beads 97a, 97b formed on opposite sides of the support plate 96 and having a rounded sectional shape can follow up the inclined leaf spring 95 so as to prevent an eccentric load from being exerted to the leaf spring 95 adapted to apply a resilient force to the seal plate 91, and accordingly, the seal plate 91 is always applied thereto with a constant resilient force, thereby it is possible to ensure a sealing function. Further, with the provision of the support plates 96, it is possible to prevent occurrence of such a problem that the leaf spring 95 is made into one-sided contact with corners c of the recess groove 24 or 25 so as to cause a plastic deformation such as a dent or an eccentric abrasion.

Further, in this embodiment, since the elongated holes 98 are formed in the inclined parts 95c of the leaf spring 95, and since the narrow inclined parts 95d of the leaf springs 95 adjacent thereto are inserted into the elongated holes 98, the leaf springs can be attached at decreased pitches, and as a result, the number of the pressing points (the center parts 95a) of the leaf springs 95 can be increased, thereby it is possible to increase the surface pressure against the seal plate 91 by the resilient force in order to enhance the sealing function.

Further, in this embodiment, the seal plate 91 and the leaf springs 95 are integrally incorporated with each other, and accordingly, the spring assembly can be readily inserted or pulled out during maintenance.

Since the seal surfaces inevitably define micro gaps in the part other than the above-mentioned pressing points, slight leakage is indispensable. The beads 92a, 92b of the seal plate 91 and the beads 97a, 97b of the support plates 96 are coated over the outer surface of the wear-resistant hard film 97 with a soft film made of Cu—Al, Cu—Al—Fe or the like or a soft film 99 formed by electroless Ni plating, and accordingly, the soft film 99 coated around the pressing points where the pressing forces are stronger, has been worn for adjustments, thereby it is possible to apply an even surface pressure to the contact surface and as well to create a gas-tight seal surface which is uniform and highly gas-tight for the seal part.

Embodiment 8

Next, explanation will be made of an eighth embodiment of the present invention with reference to FIGS. 15A to 15F. Referring to FIGS. 15A to 15F, a seal assembly in the eighth embodiment is composed of a seal plate 101 and leaf springs 106 which can be separated from the seal plate 101, and the seal plate 101 which is long and thin plate-like is formed with rounded sectional shape beads 102a, 102b similar to those in the seventh embodiment, on the opposite side end parts of the surface thereof facing the inner surfaces 24a, 25a, on the combustion passage g side, of the recess grooves 24, 25. The seal plate 101 is joined by welding, brazing or the like, thereto with support plates 104 in parts adapted to be made into contact with opposite end parts of the leaf springs 106 which will be explained later and which are parallel with the seal plate 101. Each of the support plates 104 is formed on opposite side parts of the outer surface thereof with beads 105a, 105b having the same rounded sectional shapes as that of those of the seal plate 101.

Further, the seal plate 101 and the support plate 104 are coated over their outer surface with the same wear-resistant film 108 as that in the seventh embodiment, and the wear-resistant film 108 of the support plate 101 is coated thereover with a soft film 109 similar to that in the seventh embodiment. Further, the seal plate 101 and the support plates 104 are made of a Co base alloy or a Ni base alloy similar to the seventh embodiment.

The leaf spring 106 which is thin plate-like is composed of a center part 106a parallel with the seal plate 101, opposite end parts 106b, and inclined parts 106c, the center part 106a being spot-welded (w3) to the associated one of attaching plates 107 for welding, as shown in FIGS. 15D and 15E, and the attaching plates 107 are in turn welded to the inner surfaces 24, 25, on the compressed air side, of the recess grooves 24, 25 which are formed in the opposed surfaces of the tail duct flanges. That is, all attaching plates 107 are arranged in totally two rows which are welded respectively to the recess grooves 24, 25.

With the above-mentioned configuration, when the worker gripping the handle 103 inserts the seal plate 101 into the recess grooves 24, 25, the support plates 104 are made into contact with the opposite end parts 106b of the leaf springs 106, and accordingly, they are pressed by the resilient forces of the leaf springs 106 so that the beads 102a, 102b of the support plates 102, are pressed against the inner surfaces 24a, 25b, on the combustion gas passage side, of the recess grooves 24, 25 so as to create seal surfaces.

As shown in FIG. 15F, even though a deviation Δδ is caused between the opposed surfaces of the tail duct flanges due to a thermal deformation, the beads 102a, 102b can associate with an inclination caused by the deviation so as to maintain their sealing function without being separated from the inner surfaces, on the combustion gas passage side, and further, the beads 105a, 105b of the seal plate 104 can readily follow up an inclination caused by the deviation so as to be prevented from receiving an eccentric load from the leaf springs 106, thereby it is possible to evenly transmit the resilient forces of the leaf springs 106 to the seal plate 101.

In this embodiment, the seal plates 101 and the leaf springs 106 can be separated from each other, thereby the seal assembly can have a simple structure. Since the center parts of the leaf springs 106 are welded to the inner surfaces 24b, 25b, on the compressed air a side, of the recess grooves 24, 25 so as to allow the opposite end parts 106 of the leaf spring to press the seal plate 101, the number of pressing points can be increased, thereby it is possible to enhance the surface pressure against the seal surfaces defined by the recess inner surfaces 24a, 25a and the beads 102a, 102b so as to enhance the sealing function. Thus, it is possible to surely prevent the seal assembly 100 from being lifted up due to vibration or the like.

Further, with the provision of the wear-resistant hard film 108 and the soft film 109, technical effects and advantages similar to those in the seventh embodiment can be obtained.

Embodiment 9

Figure 16A:
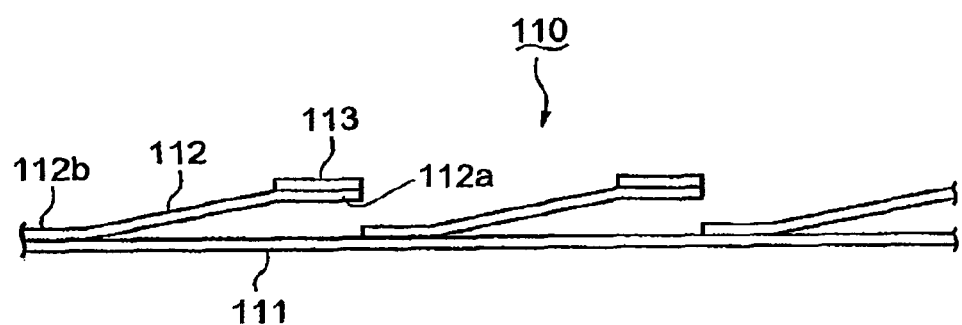
FIG. 16A is an elevation view illustrating a first variant form in a ninth embodiment of the present invention.

Next, as a ninth embodiment, explanation will be made of a variant form of the second embodiment shown in FIG. 4 and a variant form of the fourth embodiment shown in FIG. 5, with reference to FIGS. 16A, 16B. Referring to FIG. 16A which shows a variant form of the second embodiment shown in FIG. 4, that is, a variant form of the leaf springs incorporated in the seal assembly, the leaf spring 110 is composed of a planar seal plate 111, and a plurality of leaf springs 112 each having one end part which is lifted up from the seat plate 111 so as to define a parallel part 112a parallel with the seat plate 111, serving as a free end part, and the other end part which define a parallel part 112b joined to the seat plate 111 by riveting, welding or the like.

The parallel part 112a is joined, by welding, blazing or the like, thereto with a support plate 113 having one and the same configuration as that of the support plate 104 used in the eighth embodiment. With this configuration of the variant form of the second embodiment, in addition to the technical effects and advantages obtained by the second embodiment as stated above, the seal plate can be always applied thereto with a constant resilient force so as to ensure a sealing function even though a deviation is caused between the opposed surfaces of the flanges of the tail ducts since the rounded sectional shape beads formed on the opposite side end parts of the support plate 113 can readily follow up an inclination of the seat plate caused by the deviation Δδ due to a thermal deformation in the recess grooves 24, 25, and accordingly, no eccentric load is exerted to the leaf springs 112 which applies the resilient forces to the seal plate which is not shown so as to always apply a constant resilient force to the seal plate, thereby it is possible to ensure the sealing function. Further, with the provision of the support plates 113, there can be prevented occurrence of such a risk that leaf springs 112 are made into one-sided contact with corners c of the recess grooves 24, 25 so as to be dented, or they are eccentrically worn so as to be plastically deformed.

Figure 16B:
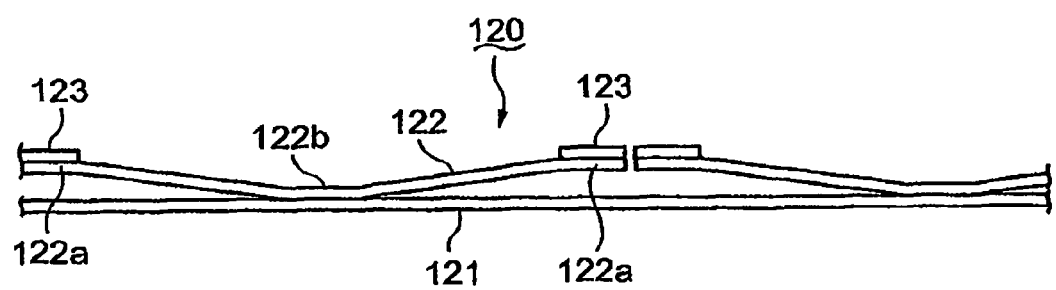
FIG. 16B is an elevation view illustrating a second variant form in the ninth embodiment of the present invention.
Figure 17:
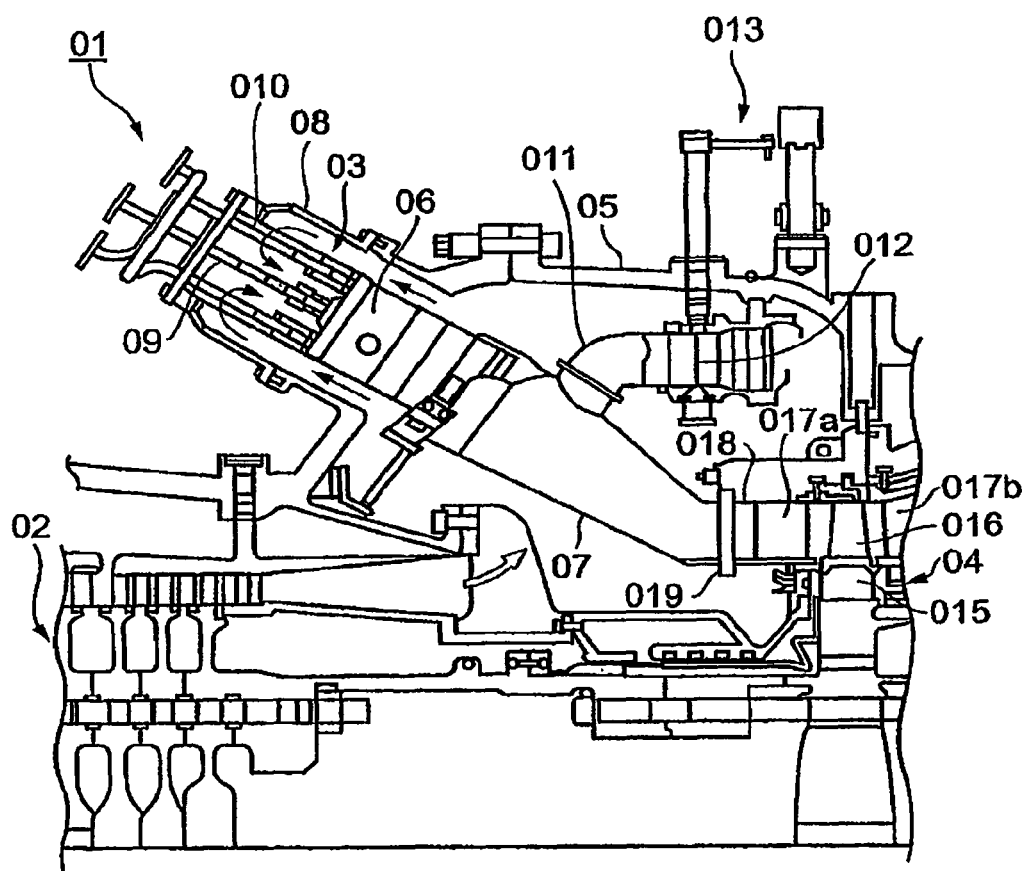
FIG. 17 is a sectional view illustrating a combustor in a conventional gas turbine.

Referring to FIG. 16B which shows a variant form of the third embodiment shown in FIG. 5, a leaf spring 120 incorporated in the seal assembly is composed of a planar seat plate 121 and a plurality of leaf springs 122 each having opposite end parts 122a which are lifted up from the seat plate 121 so as to serve as free end parts, and a center part 122b joined to the seat plate 121. The opposite end parts 122a define parallel parts which are parallel with the seat plate and which are joined thereto with support plates 123 having one and the same configuration as that of the support plate 104 used in the eighth embodiment, by welding, blazing or the like.

With this configuration, in addition to the technical effects and advantages obtained in the third embodiment as stated above, even though the opposed surfaces of the tail duct flanges cause the deviation Δδ, the rounded sectional shape beads formed on the support plates 123 can readily follow up an inclination of the seat plate 121 caused by the deviation due to a thermal deformation so as to prevent an eccentric load from being exerted to the leaf springs 122 which apply resilient forces to the seal plate which is not shown, and accordingly, the seal plate can be always applied thereto with a constant resilient force, thereby it is possible to ensure a sealing function. Further, with the provision of the support plates 123, there can be prevented occurrence of such a risk that the leaf spring 122 are made into one-sided contact with corners c of the recess grooves 24, 25 so as to be dented, or are eccentrically worn so as to be plastically deformed.

The seal structure between tail ducts in the connection between the tail duct outlet ends of a plurality of combustors which are arranged in the circumferential direction of a gas turbine, and the gas turbine inlet nozzle, according to the present invention, can maintain a satisfactory sealing function between opposed surfaces of adjacent flanges of the tail duct outlet ends for a long time even though the tail ducts are subjected to vibration or thermal deformation.

The invention claimed is:

1. A seal structure between tail ducts of a plurality of combustors arranged in the circumferential direction of a gas turbine, in connection between outlet ends of the tail ducts of the combustors and the inlet nozzle of the gas turbine, characterized in that:

recess grooves are formed respectively opposed surfaces of flanges of adjacent tail ducts at the outlet ends of the tail ducts, a seal assembly composed of a long length seal member and a leaf spring juxtaposed with the seal member is inserted in the recess grooves, the seal member has continuous beads on opposite side end parts of one of surfaces of the seal member, the beads are arranged striding between the opposed surfaces of the flanges of the tail ducts and facing the combustion gas passage side in the recess grooves, the leaf spring is arranged on the compressed air passage side of the seal member in the recess grooves, the leaf spring has a resilient force for pressing the beads against inner surfaces, on the combustion gas passage side, of the recess grooves, and the seal member and the leaf spring are formed being separated from each other, and the leaf spring has opposite end parts lifted up so as to serve as free end parts, and a center part attached to both inner surfaces on the compressed air passage side, of the recess groove facing the seal member, through the intermediary of an attaching plate for welding, and the seal member is provided at positions opposed to the opposite end pats of the leaf spring, with support plates having, at its opposite side end parts, rounded sectional shape beads striding between the opposed surfaces of the flanges of the tail ducts within the recess grooves.

2. A seal structure for a gas turbine combustor as set forth in claim 1, characterized in that the beads or the inner surfaces, on the combustion gas passage side, of the recess grooves, with which the beads are made into contact, are coated thereover with a wear-resistant film.

* * * * *